US008705899B2

(12) United States Patent
Meister et al.

(10) Patent No.: US 8,705,899 B2
(45) Date of Patent: Apr. 22, 2014

(54) OPTICAL PULSE DELAY GENERATOR

(75) Inventors: Stefan Meister, Berlin (DE); Aws Al-Saadi, Berlin (DE); Hans Joachim Eichler, Berlin (DE); Kambiz Jamshidi, Leipzig (DE); Thomas Schneider, Michendorf (DE)

(73) Assignees: Technische Universitaet Berlin, Berlin (DE); Deutsche Telekom AG, Bonn (DE)

( * ) Notice: Subject to any disclaimer, the term of this patent is extended or adjusted under 35 U.S.C. 154(b) by 221 days.

(21) Appl. No.: 13/417,131

(22) Filed: Mar. 9, 2012

(65) Prior Publication Data

US 2013/0236137 A1    Sep. 12, 2013

(51) Int. Cl.
*G02F 1/01*    (2006.01)
(52) U.S. Cl.
USPC .............................................. 385/1
(58) Field of Classification Search
None
See application file for complete search history.

(56) References Cited

U.S. PATENT DOCUMENTS

| | | | | |
|---|---|---|---|---|
| 7,245,801 | B2 * | 7/2007 | Boyd et al. | 385/27 |
| 2009/0116786 | A1 * | 5/2009 | Little et al. | 385/27 |

FOREIGN PATENT DOCUMENTS

| | | |
|---|---|---|
| DE | 10 2009 050 051.0 | 4/2011 |
| DE | 10 2010 013 727.8 | 10/2011 |

OTHER PUBLICATIONS

Choi et al. "All-fibre variable optical delay line for applications in optical coherence tomography: feasibility study for a novel delay line", Optics Express, vol. 13, No. 4, pp. 1334-1345 (Feb. 21, 2005).

Fengnian et al. "Ultracompact optical buffers on a silicon chip", Nature Photonics, vol. 1, pp. 65-71 (2007).
Capmany et al. "Reconfigurable fibre-optic delay line filters incorporating electrooptic and electroabsorption modulators", IEEE Photon. Technol. Lett., vol. 11, No. 9, pp. 1174-1176, Sep. 1999.
Capmany et al. "Discrete-time optical processing of microwave signals", Journal of Lightwave Technol., vol. 23, No. 2, pp. 702-712, Feb. 2005.
R. S. Tucker, et al., "Slow-Light Optical Buffers: Capabilities and Fundamental Limitations," Journal of Lightwave Technol., vol. 23, No. 12, pp. 4046-4066 (2005).
Burmeister et al. "A comparison of optical buffering technologies", Optical Switching and Networking 5, pp. 10-18 (2008).
J. B. Khurgin, "Optical buffers based on slow light in electromagnetically induced transparent media and coupled resonator structures: comparative analysis," JOSA. B 22, pp. 1-52 (2005).
Krauss "Why do we need slow light?", Nature Phot. 2, pp. 448-450 (2008).

(Continued)

*Primary Examiner* — Sung Pak
(74) *Attorney, Agent, or Firm* — Foley & Lardner LLP (57) ABSTRACT

An optical pulse delay generator is provided. The optical pulse delay generator includes a first optical converter which is dispersive and separates the spectral components of the incoming optical pulse in a time domain. The first optical converter generating a converted optical signal. The optical pulse delay generator also includes a modulator to modulate the converted optical signal and to generate a modulated optical signal and a second optical converter connected to the modulator. The second optical converter being dispersive for overlaying the previously separated spectral components in the time domain and generating the delayed optical output pulse. The dispersion imposed by the second optical converter has the same amount of dispersion, but the opposite sign, as the first optical converter. At least one of the first and second optical converter includes at least two waveguide resonator rings which differ in their optical length.

17 Claims, 4 Drawing Sheets

(56) References Cited

OTHER PUBLICATIONS

Sharping et al. "All-optical wavelength and bandwidth preserving, pulse delay based on parametric wavelength conversion and dispersion", Optics Express, vol. 13, No. 20, pp. 7872-7877 (Oct. 3, 2005).

Dai et al. "1 µs tunable delay using parametric mixing and optical phase conjugation in Si waveguides", Optics Express, vol. 17, No. 9, pp. 7004-7010 (Apr. 27, 2009).

Preußler et al. "Quasi light storage based on time frequency coherence", Optics Express, vol. 17, No. 18, pp. 15790-15798 (Aug. 31, 2009).

Schneider et al. "Quasi light storage: a method for the tunable storage of optical packets with a potential delay-bandwidth product of several thousand bits", Journal of Lightwave Technology, vol. 28, No. 17, pp. 2586-2592 (Sep. 1, 2010).

K. Jamshidi et aI. "A proposal for a tunable light storage method based on Quasi-Light-torage and frequency-to-time-conversion", Photonics in switching, Montery, California, 2 pages, Jul. 2010.

K. Jamshidi, et al., "Widely tunable optical delay generator," Optics Letters, vol. 35, No. 21, pp. 3592-3594 (Nov. 1, 2010).

K. Jamshidi, et al, "Very large, tunable, positive and negative group delay for high-bandwidth signals," European Conference on Communication (ECOC Turin, Italy, 2010), Th.9.C.5, 3 pages.

Xin et al. "Broadband Tunable Optical Delay based on Real-time Fourier Transformation and Ramp-type Phase Modulation", Optics Letters, 35, 13 pages (2010).

Howe et al. "Ultrafast optical delay line by use of a time-prism pair", Optics Letters, No. 30, vol. 1, pp. 99-101 (Jan. 1, 2005).

Jamshidi et al. "A review to the all optical Quasi Light Storage", IEEE Journal of Selected topics in Quantum Electronics, 7 pages (2011).

S. Meister et al., "Photonic crystal microcavities in SOI waveguides produced in a CMOS environment", SPIE, vol. 7606; pp. 760616 1-760616 12; (2010).

V. R. Almeida, "All-optical control of light on a silicon chip", Letters to Nature, vol. 431, pp. 1081-1084 (Oct. 28, 2004).

N. Izhaky et al., "Development of CMOS-Compatible integrated silicon photonics devices", IEEE Journal of Selected Topics in Quantum Electronics, vol. 12, No. 6, pp. 1688-1698 (2006).

C. K. Madsen et al., "Multistage dispersion compensator using ring resonators", Optics Letters, vol. 24, No. 22, pp. 1555-1557 (Nov. 15, 1999).

* cited by examiner

OPTICAL PULSE DELAY GENERATOR

The present invention relates to devices and methods for delaying an incoming optical pulse and generating a delayed optical output pulse.

BACKGROUND OF THE INVENTION

An optical delay generator can be used for various applications. Time resolved spectroscopy, optical coherence tomography, jitter compensation, microwave photonic devices such as filters and antenna beam formers are some of these applications [1]-[7]. One of the highly interesting applications would be optical buffering which has been considered in the context of optical packet switching or optical burst switching [5]-[7].

Several methods have been introduced to delay the pulses all optically [5]-[17]. These methods can be divided into three main categories. In the first category, the length of the transmission media is changed to produce the desired delay [5]. Changing of the length can be done by increasing the length of the media or by using the circulation of the light in a specific length of the media. Both fiber and integrated solutions can be used to realize these methods. The main benefit of the methods in this category is that they can produce a large range of delay times [5, 7]. Also, they are independent of the incoming signal properties like bandwidth since only the length of the medium is changed.

In so called "Slow Light" techniques the dispersion of the media is tailored to produce the required delay [8]. This can be done via two different methods. The first method is named material based slow light where different properties of the propagation media are changed to add a linear phase to the spectrum of the incoming pulse which is the meaning of the delay in the spectral domain. This can be achieved by dispersion which is induced near resonance e.g. electromagnetically induced transparency (EIT) techniques or stimulated Brillouin scattering (SBS) based slow light. The second method is named structure based slow light in which a linear phase is added to the spectrum of the incoming signal by a specific structure of the components. This method usually uses fiber Bragg Gratings (FBG) to avoid frequency dependent distortions.

In a third category which is sometimes called wavelength conversion/dispersion method, the wavelength of the input pulse is changed. The required delay comes from the wavelength dependent dispersion of the material [8]-[10]. Afterwards the original wavelength is restored. Several variations of this category have been introduced up to a delay of several microseconds.

Another method proposed for delaying optical pulses is called Quasi-Light-Storage (QLS) [11]-[15]. Fiber based and Frequency-to-time conversion based QLS have been proposed up to a delay of several microseconds.

The performance of each of the above-mentioned schemes can be evaluated by several metrics such as maximum achievable delay, ability to be integrated, size, easy implementation, accuracy of control, the speed of operation, structural complexity, power consumption, and ability for easy tuning of the delay:

The tunability of the first category is in the coarse range, and usually the attenuation of the incoming signal is large.

Delay production methods based on the second category usually cannot produce large amounts of the delay-bandwidth products, e. g. 4 bits for SBS based slow light.

Structure based slow light methods can produce higher amounts of delay, but higher order phase distortions (like dispersion) limit the useful bandwidth of these methods.

The third category requires tunable lasers and filters for the wavelength shift which makes it very complex and power consumptive.

OBJECTIVE OF THE PRESENT INVENTION

An objective of the present invention is to provide an optical pulse delay generator which is capable of providing large amount of delay and allows easy tuning.

A further objective of the present invention is to provide a method which allows providing large amount of delay and easy tuning.

BRIEF SUMMARY OF THE INVENTION

An embodiment of the present invention relates to an optical pulse delay generator for delaying an incoming optical pulse and generating a delayed optical output pulse; said optical pulse delay generator comprising:

a first optical converter which is dispersive and separates the spectral components of the incoming optical pulse in a time domain, said first optical converter generating a converted optical signal;

a modulator configured to modulate the converted optical signal and to generate a modulated optical signal;

a second optical converter connected to the modulator, said second optical converter being dispersive for overlaying the previously separated spectral components in the time domain and generating said delayed optical output pulse, wherein the dispersion imposed by the second optical converter has the same amount of dispersion, but the opposite sign, as the first optical converter; and wherein at least one of the first and second optical converter comprises at least two waveguide resonator rings which differ in their optical length.

An advantage of this embodiment of the invention is that the first and/or second optical converter may provide a very large bandwidth compared to prior art devices. The bandwidth enhancement is caused by the differing optical length of the waveguide resonator rings.

A further advantage of this embodiment of the invention is that each of the waveguide resonator rings allows individually modifying its resonance frequency and thereby adjusting of the converter's overall bandwidth.

The at least two waveguide resonator rings of the first or second optical converter are preferably integrated in a semiconductor substrate. For instance, both the first and second optical converters as well as the modulator may be integrated in the same semiconductor substrate.

A SOI (silicon-on-insulator)-substrate is considered advantageous. Therefore, the at least two waveguide resonator rings are preferably formed by SOI (silicon-on-insulator)-waveguides. The SOI-waveguides may have a waveguide width of less than 1 μm.

At least one of said at least two waveguide resonator rings preferably comprises an adjustment unit capable of tuning the optical length of the respective waveguide resonator ring. The adjustment unit may comprise a pn- or pin-diode structure capable of injecting and/or depleting carriers into or from the waveguide resonator ring.

According to a preferred embodiment the first optical converter comprises at least two waveguide resonator rings and a waveguide, said waveguide being coupled to said at least two waveguide resonator rings and connecting an input port of the first optical converter to an output port of the first optical converter, wherein the input port of the first optical converter receives the incoming optical pulse and wherein the output port of the first optical converter outputs the converted optical signal.

Additionally or alternatively, the second optical converter may comprise at least two waveguide resonator rings and a waveguide, said waveguide being coupled to said at least two waveguide resonator rings and connecting an input port of the second optical converter to an output port of the second optical converter, wherein the input port of the second optical converter receives the modulated optical signal and wherein the output port of the second optical converter outputs said delayed optical output pulse.

The modulator is preferably a phase-modulator configured to generate a phase-modulated optical signal. The phase-modulator may be configured to apply a saw-tooth-shaped phase modulation over time to the converted optical signal.

The first optical converter may be a frequency-to-time conversion element, and the second optical converter may be a time-to-frequency conversion element.

A further embodiment of the present invention relates to an optical signal processing unit configured for delaying an incoming optical pulse and generating a delayed optical output pulse, said optical signal processing unit comprising
  a first optical converter which is dispersive and separates the spectral components of the incoming optical pulse in a time domain, said first optical converter generating a converted optical signal;
  a modulator configured to modulate the converted optical signal and to generate a modulated optical signal;
  a second optical converter connected to the modulator, said second optical converter being dispersive for overlaying the previously separated spectral components in the time domain and generating said delayed optical output pulse,
  wherein the dispersion imposed by the second optical converter has the same amount of dispersion, but the opposite sign, as the first optical converter; and
  wherein both, the first and second optical converters as well as the modulator are integrated in the same SOI-semiconductor substrate.

The modulator is preferably a phase-modulator configured to apply a saw-tooth-shaped phase modulation over time to the converted optical signal.

A further embodiment of the present invention relates to a method of delaying an incoming optical pulse and generating a delayed optical output pulse, comprising the steps of:
  dispersion-based separating of the spectral components of the incoming optical pulse in a time domain, and generating a converted optical signal;
  modulating the phase and/or amplitude of the converted optical signal and generating a modulated optical signal; and
  overlaying the previously separated spectral components in the time domain and generating said delayed optical output pulse,
  wherein the dispersion imposed on the previously separated spectral components has the same amount, but the opposite sign, as the dispersion imposed on the incoming optical pulse; and
  wherein the dispersion imposed on the incoming optical pulse or the dispersion imposed on the previously separated spectral components is generated by at least two waveguide resonator rings which differ in their optical length.

Preferably, a saw-tooth-shaped or a n-th order electrical signal is applied to a phase modulator to phase-modulate the converted optical signal.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended figures. Understanding that these figures depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings, wherein identical or comparable parts are designated by the same reference signs throughout.

It will be readily understood that the present invention, as generally described herein, could vary in a wide range. Thus, the following more detailed description of the exemplary embodiments of the present invention, is not intended to limit the scope of the invention, as claimed, but is merely representative of presently preferred embodiments of the invention.

Figure 1:
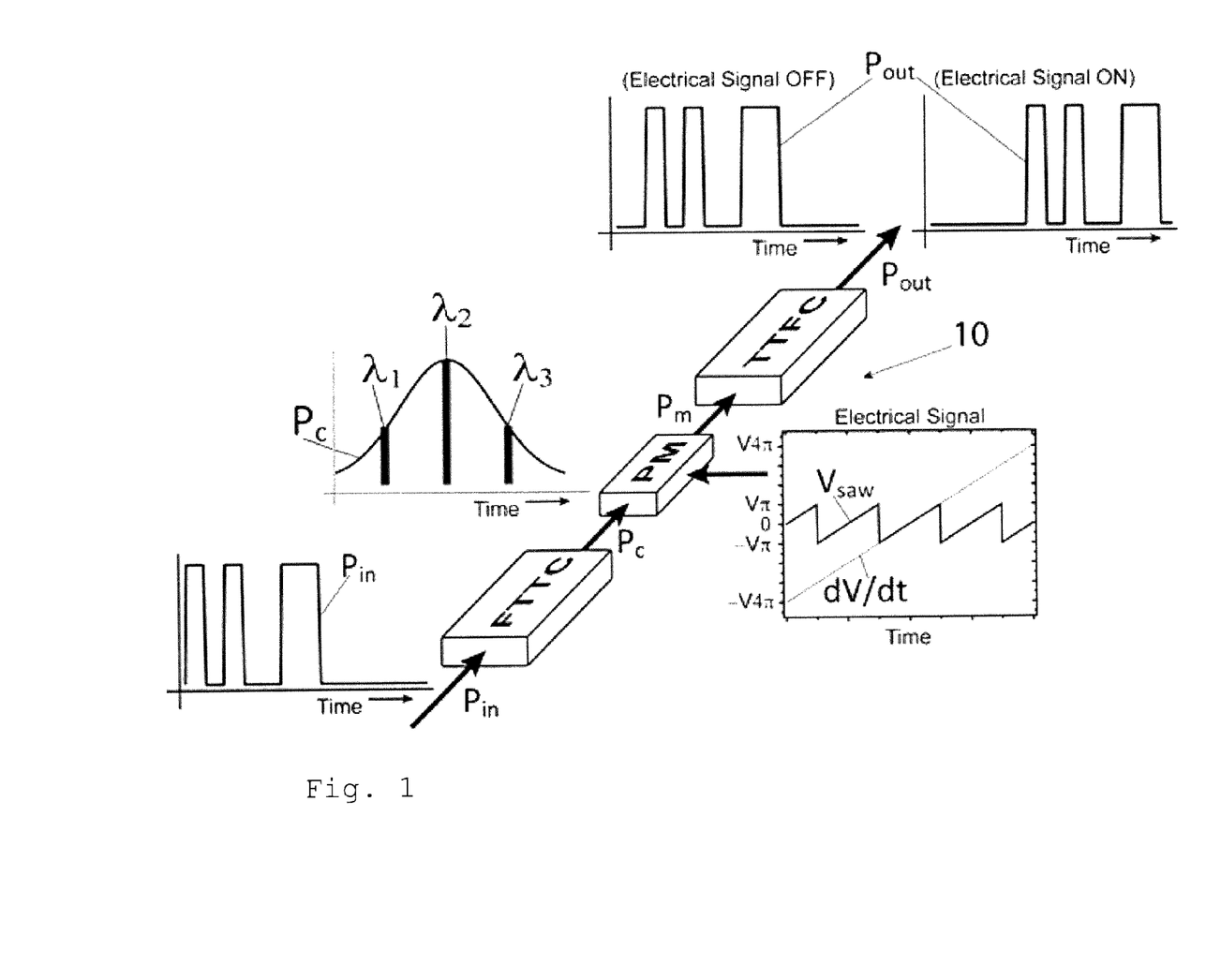
FIG. 1 shows an exemplary embodiment of an optical pulse delay generator according to the present invention in a schematic representation.

FIG. 1 shows a three-dimensional schematic view of an exemplary embodiment of an optical pulse delay generator 10 for delaying an incoming optical pulse Pin and generating a delayed optical output pulse Pout.

The delay generator 10 comprises a first optical converter FTTC. The first optical converter FTTC is a frequency-to-time conversion element, which is dispersive and separates the spectral components of the incoming optical pulse Pin in time domain. The first optical converter FTTC outputs a converted optical signal Pc. It can be seen in FIG. 1 that the pulse shape of the converted optical signal Pc is broadened compared to the shape of the incoming optical pulse Pin. The broadening results from the fact that the wavelengths $\lambda 1$, $\lambda 2$ and $\lambda 3$ of the converted optical signal Pc are separated from one another due to their different delay.

The first optical converter FTTC is connected to a phase modulator PM which applies a saw-tooth-shaped phase modulation over time to the converted optical signal Pc and generates a modulated optical signal Pm. The saw-tooth-shaped electrical voltage signal Vsaw, which linearly increases between $-V\pi$ and $+V\pi$, controls the phase modulator PM and causes said saw-tooth-shaped phase modulation over time.

The modulated optical signal Pm is inputted into a second optical converter TTFC which is connected to the phase modulator PM. The second optical converter TTFC is dispersive and overlays or adjusts the spectral components that were previously separated in the time domain, relative to each other. As such, the second optical converter TTFC generates an optical output pulse Pout which has the same shape as the input pulse Pin but is delayed with respect to the input pulse Pin.

In order to appropriately reshape the pulse, the dispersion imposed by the second optical converter TTFC has the same amount of dispersion, but the opposite sign compared to the first optical converter FTTC.

The functionality of the delay generator 10 is based on mapping the different spectral components of the incoming pulse Pin into different delays and manipulating the spectrum via the phase modulator PM in time domain. This approach takes advantage of the fact that manipulation of the spectral components can be done easier in the time domain than in the frequency domain. The mapping between spectrum and time can be realized by a dispersive media, since dispersion means that different spectral components of the incoming signal travel with different speed. If the dispersion of the dispersive media is composed of just second order dispersion, a linear mapping between the frequency and time may be achieved. After encoding the spectrum of the incoming pulse, the spectral components may be overlapped to reconstruct the original pulse. The reconstruction is carried out by the second dispersive media that is incorporated in the second optical converter TTFC.

The dispersion of the dispersive media of the second optical converter TTFC equals the dispersion of the first optical converter FTTC but neutralizes the FTTC's effect due to the inverted direction of dispersion. Therefore, the whole delay generator 10 can be viewed as a reconfigurable spectral phase encoder.

Figure 2:
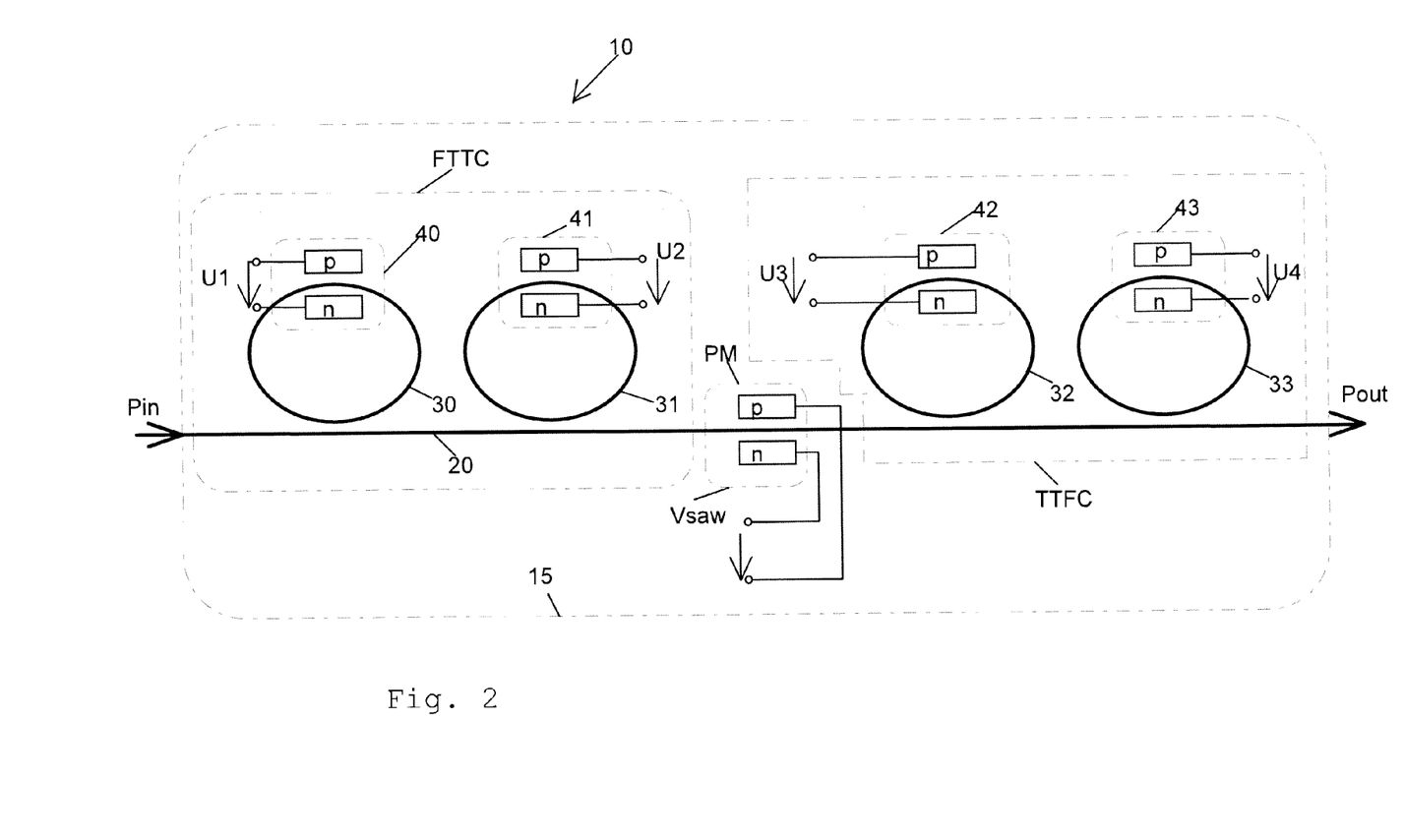
FIG. 2 shows the optical pulse delay generator according to FIG. 1 in further detail.

FIG. 2 shows the delay generator 10 of FIG. 1 in further detail. The entire delay generator 10 is monolithically integrated in a Silicon-on-Insulator (SOI)-substrate 15. The delay generator 10 comprises a SOI-waveguide 20 that passes through the first optical converter FTTC, the phase modulator PM and the second optical converter TTFC. The SOI-waveguide 20 may consist of a nanometer-sized rib waveguide or a so-called SOI-nano-wire.

As can be seen in FIG. 2, each of the first and second converters FTTC and TTFC comprises two pairs of ring resonators 30, 31, 32, and 33 which produce the desired amount of dispersion. The waveguides of each ring resonator 30, 31, 32, and 33 are preferably nanometer-sized rib waveguides or so-called SOI-nano-wires because such waveguides allow very small bending radii.

The ring resonators 30, 31, 32, and 33 may have a length of 100 µm which provides a free spectral range (FSR) of 2.3 nm to support the linear dispersion for the input signal Pin (e. g. a stream of data with 40 Gbps data rate).

In order to compensate technological insufficiencies and to provide the requested dispersion in a given wavelength band, the phase shift of the ring resonators 30, 31, 32, and 33 may be fine tuned by applying a bias voltage U1, U2, U3, and U4 to phase modulators 40, 41, 42, and 43 that are assigned to the ring resonators 30, 31, 32, and 33.

Each phase modulator 40, 41, 42, and 43 may comprise an integrated p-i-n diode structure that provides for phase modulation based on the free carrier plasma dispersion effect. The p-doped and n-doped regions of the p-i-n junctions are indicated by reference signs "p" and "n" in FIG. 2.

The phase modulator PM may be based on a p-i-n diode structure that encompasses the SOI-waveguide 20.

The p-i-n diode structures alongside the SOI-waveguide 20 and alongside the ring modulators preferably provide electro-optical functionalities by the free carrier plasma dispersion effect. The refractive index of the SOI-waveguide 20 and the refractive index of the ring modulators may be changed by injecting or depleting carriers in or from the respective p-i-n junction.

The group delay of the cascaded ring resonators in each of the first and second converters FTTC and TTFC can be written as:

$$T_g = T \sum_{n=1}^{2} \exp(-j\varphi_n) \frac{k_n}{2 - k_n - 2\sqrt{1 - k_n} \cos(\omega T - \varphi_n)} \quad (1)$$

where kn is the power coupling ratio to the n-th resonator, T is the delay for one trip in the ring, and φn is the phase shift in the n-th resonator. The first derivative of the group delay versus wavelength is the produced second order dispersion.

The power coupling ratio and phase of each resonator is preferably configured to solely produce second order dispersion because second order dispersion linearly maps the different spectral components of the incoming signal into the time domain.

As an example, a near flat second order dispersion in an acceptable frequency range may be created by the following parameters: k1=88%, k2=96%, φ1=π/2, and φ2=84π/100.

Figure 3:
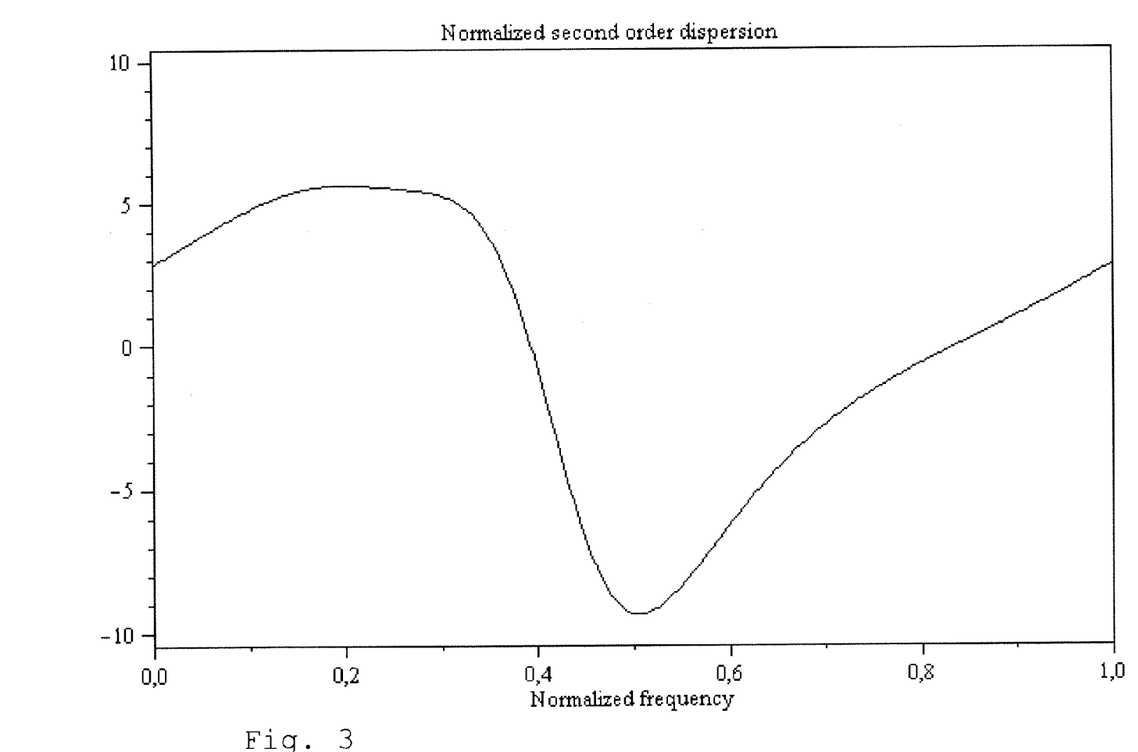
FIG. 3 shows the normalized dispersion versus the normalized frequency of two cascaded ring resonators of the pulse delay generator shown in F*igure* 2.

The normalized dispersion produced by the cascaded ring resonators using these parameters is sketched in FIG. 3. The normalized dispersion is defined as $D_n = -D\lambda_2/cT_2$, where D is the produced dispersion by the double ring resonators, λ is the wavelength of the incoming light, and c is the speed of light.

The frequency axis of FIG. 3 is normalized to the free spectral range (FSR) which is the inverse of the round trip time in the ring resonator 30, 31, 32, and 33 of FIG. 2. It can be seen that a flat second order dispersion can be obtained for 20 percent of the FSR around 0.22*FSR.

As mentioned above with respect to FIG. 1, a saw-tooth signal is preferably applied to the phase modulator PM to generate the delay. The amount of delay is proportional to the slope dV/dt of the electrical saw-tooth-shaped signal Vsaw.

Additionally or alternatively, a n-th (n>2) order electrical signal may be used for the production or compensation of n-th order dispersion. Such a n-th order electrical signal may increase the usable part of the FSR (>20% of FSR in FIG. 3) for delay generation.

Figure 4:
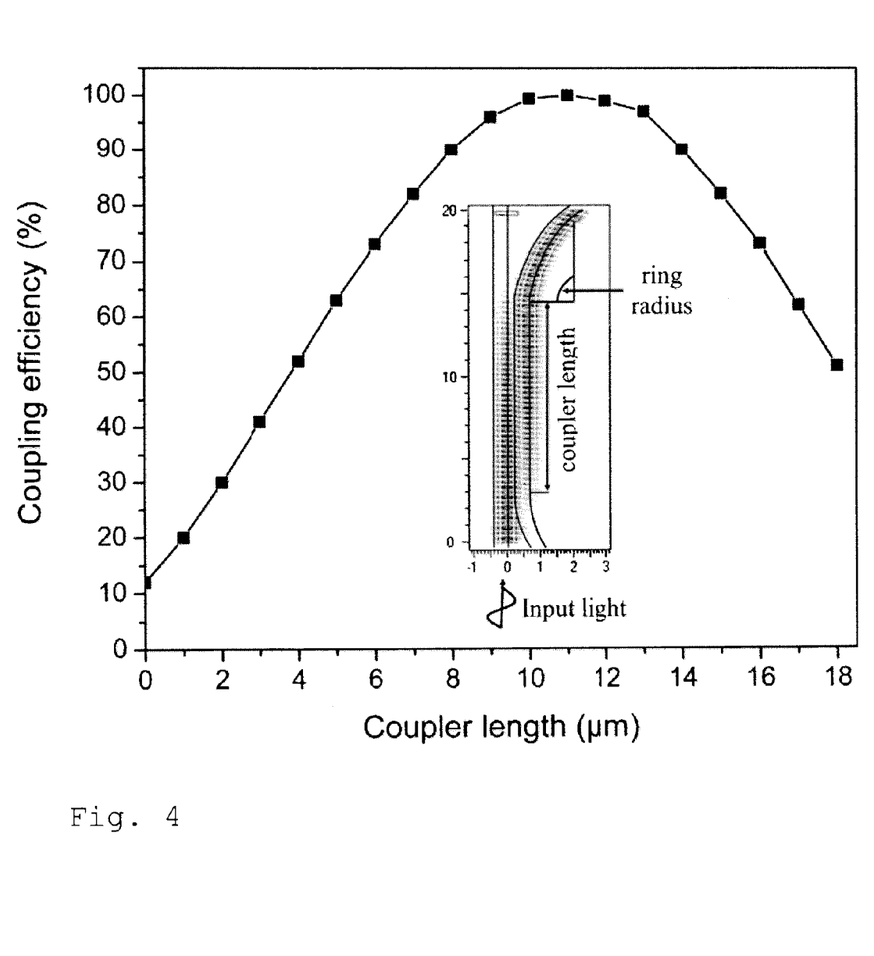
FIG. 4 shows the coupling efficiency versus the straight length of waveguide couplers of the pulse delay generator as shown in FIG. 2.

The coupling efficiency of the SOI-waveguide 20 to the ring resonators 30-33 were simulated using a Finite Difference Time Domain (FDTD) method. For the full integration into the SOI platform, SiO$_2$ covered single mode waveguides with 220 nm×450 nm dimensions were chosen which have a remaining Si slab of 50 nm for carrier injection. The gap for the waveguide coupler was set to 190 nm. In FIG. 4 the coupling efficiency depending on the length of the waveguide coupler is shown. The bending radius is 12.5 µm to provide low bending losses. For the required coupling efficiencies of k1=88% and k2=96% the simulated coupler lengths are 7.8 µm and 9.3 µm, respectively. Simulation results show that the technological requirements on the couplers are moderate and therefore such structures can be fabricated in a CMOS (Complementary Metal Oxide Semiconductor) environment.

In summary, the delay generator as discussed above in an exemplary fashion is based on SOI-material. With an intrinsic bandgap of 1.1 eV silicon is transparent at wavelengths typically used for optical communication transmission, i.e. 1270 nm-1625 nm. In addition, the possibility to produce silicon photonics devices in a CMOS-environment offers an opportunity for very low-cost photonic solutions. Furthermore, the ability to integrate silicon photonic devices with electronic control functions opens a wide range of applications from telecommunications to chip-to-chip interconnects, and on-chip communication.

When fabricated in SOI-material the size of the whole delay generator may be less than several hundreds of micrometers square.

Moreover, the delay generator as discussed above allows changing the amount of delay simultaneously in fine and coarse regimes. This can be achieved by adapting the slope of the saw-tooth-shaped electrical signal.

| Reference Signs | |
| --- | --- |
| 10 | delay generator |
| 15 | SOI-substrate |
| 20 | SOI-waveguide |
| 30-33 | ring resonator |
| 40-43 | phase modulator |
| dV/dt | slope |
| FTTC | first optical converter |
| n | n-doped region |
| p | p-doped region |
| Pc | converted optical signal |
| Pin | incoming optical pulse |
| PM | phase modulator |
| Pm | modulated optical signal |
| Pout | delayed optical output pulse |
| Vsaw | saw-tooth-shaped electrical voltage signal |
| TTFC | second optical converter |
| U1-U4 | bias voltage |
| +Vπ | voltage for a phase modulation of π |
| −Vπ | voltage for a phase modulation of −π |
| λ1, λ2, λ3 | wavelength |

REFERENCES

[1] Choi et al. "All-fibre variable optical delay line for applications in optical coherence tomography: feasibility study for a novel delay line", Opt. Express 13, 1334-1345 (2005)

[2] Fengnian et al. "Ultracompact optical buffers on a silicon chip", Natur Photon., Vol. 1, pp 65-71 (2007)

[3] Capmany et al. "Reconfigurable fibre-optic delay line filters incorporating electrooptic and electroabsorption modulators", IEEE Photon. Technol. Lett., vol. 11, No. 9, pp. 1174-1176, September 1999

[4] Capmany et al. "Discrete-time optical processing of microwave signals", J. Lightw. Technol., vol. 23, no 2, pp. 702-712, February 2005

[5] R. S. Tucker, et al., "Slow-Light Optical Buffers: Capabilities and Fundamental Limitations," JLT. 23, 4046-4066 (2005)

[6] Burmeister et al. "A comparison of optical buffering technologies", Optical Switching and Networking 5, 10-18 (2008)

[7] J. B. Khurgin, "Optical buffers based on slow light in electromagnetically induced transparent media and coupled resonator structures: comparative analysis," JOSA. B 22, 1062-1074 (2005)

[8] Krauss "Why do we need slow light?", Nature Phot. 2, 448-450 (2008)

[9] Sharping et al. "All-optical wavelength and bandwidth preserving, pulse delay based on parametric wavelength conversion and dispersion", Opt. Express 13, 7872-7877 (2005)

[10] Dai et al. "1 μs tunable delay using parametric mixing and optical phase conjugation in Si waveguides", Opt. Express 17, 7004-7010 (2009)

[11] Preußler et al. "Quasi light storage based on time frequency coherence", Opt. Express, 17, 15790-15798 (2009)

[12] Schneider et al. "Quasi light storage: a tunable method fort he storage of optical packets with a potential delay-bandwidth product of several thousand bits", J. Lightwave Technol. 28, 2586-2592 (2010)

[13] K. Jamshidi et al. "A proposal for a tunable light storage method based on Quasi-Light-Storage and frequency-to-time-conversion", Photonics in switching, Montery, Calif., July 2010

[14] K. Jamshidi, et al., "A widely tunable optical delay generator," OL, 35, 3592-3594 (2010)

[15] K. Jamshidi, et al, "Very large, tunable, positive and negative group delay for high-bandwidth signals," in European Conference on Communication (ECOC Turin, Italy, 2010), Th.9.C.5

[16] Xin et al. "Broadband Tunable Optical Delay based on Real-time Fourier Transformation and Ramp-type Phase Modulation", Opt. Lett. 35, 1596 (2010)

[17] Howe et al. "Ultrafast optical delay line by use of a time-prism pair", Opt. Lett. 30, 99-101 (2005)

The invention claimed is:

1. Optical pulse delay generator for delaying an incoming optical pulse and generating a delayed optical output pulse; said optical pulse delay generator comprising:
    a first optical converter which is dispersive and separates the spectral components of the incoming optical pulse in a time domain, said first optical converter generating a converted optical signal;
    a modulator configured to modulate the converted optical signal and to generate a modulated optical signal;
    a second optical converter connected to the modulator, said second optical converter being dispersive for overlaying the previously separated spectral components in the time domain and generating said delayed optical output pulse,
    wherein the dispersion imposed by the second optical converter has the same amount of dispersion, but the opposite sign, as the first optical converter; and
    wherein at least one of the first and second optical converter comprises at least two waveguide resonator rings which differ in their optical length.

2. Optical pulse delay generator according to claim 1 wherein said at least two waveguide resonator rings of the first or second optical converter are integrated in a semiconductor substrate.

3. Optical pulse delay generator according to claim 2 wherein both, the first and second optical converters as well as the modulator are integrated in the same semiconductor substrate.

4. Optical pulse delay generator according to claim 3 wherein said same substrate is a SOI (silicon-on-insulator)-substrate.

5. Optical pulse delay generator according to claim 2 wherein the at least two waveguide resonator rings are formed by SOI (silicon-on-insulator)-waveguides.

6. Optical pulse delay generator according to claim 5 wherein the SOI(silicon-on-insulator)-waveguides have a waveguide width of less than 1 μm.

7. Optical pulse delay generator according to claim 1 wherein at least one of said at least two waveguide resonator rings comprises an adjustment unit capable of tuning the optical length of the respective waveguide resonator ring.

8. Optical pulse delay generator according to claim 7 wherein said adjustment unit comprises a pn- or pin-diode structure capable of injecting and/or depleting carriers into or from the waveguide resonator ring.

9. Optical pulse delay generator according to claim 1
wherein the first optical converter comprises at least two waveguide resonator rings and a waveguide, said waveguide being coupled to said at least two waveguide resonator rings and connecting an input port of the first optical converter to an output port of the first optical converter;
wherein the input port of the first optical converter receives the incoming optical pulse; and
wherein the output port of the first optical converter outputs the converted optical signal.

10. Optical pulse delay generator according to claim 1
wherein the second optical converter comprises at least two waveguide resonator rings and a waveguide, said waveguide being coupled to said at least two waveguide resonator rings and connecting an input port of the second optical converter to an output port of the second optical converter;
wherein the input port of the second optical converter receives the modulated optical signal, and
wherein the output port of the second optical converter outputs said delayed optical output pulse.

11. Optical pulse delay generator according to claim 1 wherein said modulator is a phase-modulator configured to generate a phase-modulated optical signal.

12. Optical pulse delay generator according to claim 11 wherein said phase-modulator is configured to apply a saw-tooth-shaped phase modulation over time to the converted optical signal.

13. Optical pulse delay generator according to claim 1
wherein the first optical converter is a frequency-to-time conversion element, and
wherein the second optical converter is a time-to-frequency conversion element.

14. Optical signal processing unit configured for delaying an incoming optical pulse and generating a delayed optical output pulse, said optical signal processing unit comprising
a first optical converter which is dispersive and separates the spectral components of the incoming optical pulse in a time domain, said first optical converter generating a converted optical signal;
a modulator configured to modulate the converted optical signal and to generate a modulated optical signal;
a second optical converter connected to the modulator, said second optical converter being dispersive for overlaying the previously separated spectral components in the time domain and generating said delayed optical output pulse,
wherein the dispersion imposed by the second optical converter has the same amount of dispersion, but the opposite sign, as the first optical converter; and
wherein both, the first and second optical converters as well as the modulator are integrated in the same SOI-semiconductor substrate.

15. Optical signal processing unit according to claim 14 wherein said modulator is a phase-modulator configured to apply a saw-tooth-shaped phase modulation over time to the converted optical signal.

16. Method of delaying an incoming optical pulse and generating a delayed optical output pulse, comprising the steps of:
dispersion-based separating of the spectral components of the incoming optical pulse in a time domain, and generating a converted optical signal;
modulating the phase and/or amplitude of the converted optical signal and generating a modulated optical signal; and
overlaying the previously separated spectral components in the time domain and generating said delayed optical output pulse,
wherein the dispersion imposed on the previously separated spectral components has the same amount, but the opposite sign, as the dispersion imposed on the incoming optical pulse; and
wherein the dispersion imposed on the incoming optical pulse or the dispersion imposed on the previously separated spectral components is generated by at least two waveguide resonator rings which differ in their optical length.

17. Method of claim 16 wherein a saw-tooth-shaped or a n-th order electrical signal is applied to a phase modulator to phase-modulate the converted optical signal.

* * * * *